(12) United States Patent
Ochiai

(10) Patent No.: US 10,143,190 B2
(45) Date of Patent: Dec. 4, 2018

(54) SPINNING REEL SPOOL AND SPINNING REEL

(71) Applicant: Shimano Inc., Sakai, Osaka (JP)

(72) Inventor: Koji Ochiai, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 137 days.

(21) Appl. No.: 15/268,149

(22) Filed: Sep. 16, 2016

(65) Prior Publication Data

US 2017/0156300 A1 Jun. 8, 2017

(30) Foreign Application Priority Data

Dec. 4, 2015 (JP) ................. 2015-237260

(51) Int. Cl.
| | | |
|---|---|---|
| *A01K 89/01* | (2006.01) | |
| *A01K 89/033* | (2006.01) | |
| *A01K 89/027* | (2006.01) | |

(52) U.S. Cl.
CPC ........ *A01K 89/047* (2015.05); *A01K 89/0111* (2013.01); *A01K 89/027* (2013.01); *A01K 89/03* (2015.05)

(58) Field of Classification Search
CPC .. A01K 89/01; A01K 89/0111; A01K 89/028; A01K 89/03; A01K 89/027
See application file for complete search history.

(56) References Cited

U.S. PATENT DOCUMENTS

| | | | |
|---|---|---|---|
| 4,368,857 A | | 1/1983 | Jacob et al. |
| 4,735,375 A | * | 4/1988 | Tunoda ................ A01K 89/027 242/246 |

FOREIGN PATENT DOCUMENTS

| | | | |
|---|---|---|---|
| CN | 204499185 U | 7/2015 | |
| JP | 3310528 B2 | 8/2002 | |
| JP | 2006042771 A | 2/2006 | |
| JP | 2007-004140 | * 11/2006 | ........... A01K 89/027 |
| JP | 2011125264 A | 6/2011 | |

OTHER PUBLICATIONS

Extended European Search Report for corresponding European Application EP 16198278.0, dated Apr. 26, 2017, p. 1-8.

* cited by examiner

*Primary Examiner* — Emmanuel M Marcelo
(74) *Attorney, Agent, or Firm* — United IP Counselors, LLC

(57) ABSTRACT

A spool for a spinning reel is mountable on a spool shaft. The spool includes a spool body that rotates with respect to the spool shaft. The spool also includes a drag mechanism between the spool body and the spool shaft to apply a braking force against a rotation of the spool body. The spool further includes a radiator in the spool body and in contact with the drag mechanism. The radiator rotates with respect to one of the spool body or the spool shaft. The radiator does not rotate with respect to the other one of the spool body or the spool shaft.

19 Claims, 5 Drawing Sheets

10,143,190 B2

SPINNING REEL SPOOL AND SPINNING REEL

CROSS-REFERENCE TO RELATED APPLICATIONS

This application claims priority to Japanese Patent Application No. 2015-237260, filed on Dec. 4, 2015, the entirety of which is hereby incorporated by reference in its entirety.

BACKGROUND

Technical Field

The present disclosure relates to spools for spinning reels, and more particularly, to a spinning reel spool mounted on a spool shaft. The disclosure also relates to spinning reels, and more particularly, to a spinning reel with a spool.

Description of the Background

Some spinning reels known in the art include a spool body mounted on a spool shaft and a drag mechanism housed in a drag housing space inside the spool body.

The drag mechanism of such a spinning reel can generate heat when activated by tensile stress on a fishing line. To dissipate such heat, a spinning reel known in the art has a heat dissipating space (channel) defined between the spool body and the drag housing space (refer to, for example, Japanese Unexamined Patent Application Publication No. 2006-42771). In this spinning reel, air in the heat dissipating space is discharged out of the spool body when the drag mechanism housed in the drag housing space generates heat. This discharge regulates a temperature rise in the drag mechanism.

BRIEF SUMMARY

Such spinning reels known in the art discharge air in the heat dissipating space out of the spool body to regulate a temperature rise in the drag mechanism.

However, indirectly dissipating heat generated in the drag mechanism through the air in the heat dissipating space might not be effective enough to regulate the temperature of the drag mechanism. If the temperature inside the drag housing space containing the drag mechanism rises, components of the drag mechanism, including the grease and the lining, might not achieve their intended performance.

One or more aspects of the present disclosure are directed to a spool for a spinning reel that effectively regulates a temperature rise in a drag mechanism, and a spinning reel that effectively regulates a temperature rise in a drag mechanism.

(1) A spool for a spinning reel according to one aspect of the present disclosure is mountable on a spool shaft. The spool includes a spool body, a drag mechanism, and a radiator. The spool body rotates with respect to the spool shaft. The drag mechanism is arranged between the spool body and the spool shaft. The drag mechanism applies a braking force against a rotation of the spool body. The radiator is arranged in the spool body and is in contact with the drag mechanism. The radiator rotates with respect to one of the spool body or the spool shaft, and does not rotate with respect to the other one of the spool body or the spool shaft.

In this spool, the relative rotation of the spool body with respect to the spool shaft activates the drag mechanism. The radiator, in contact with the drag mechanism, then dissipates heat generated in the drag mechanism. In this spool, the radiator can directly dissipate heat generated in the drag mechanism. This structure effectively regulates a temperature rise in the drag mechanism.

(2) In the spool according to another aspect of the present disclosure, the radiator rotates with respect to the spool body and does not rotate with respect to the spool shaft.

In this case, the spool body rotates with respect to the spool shaft and the radiator. The radiator in this structure is in contact with the drag mechanism, and can directly dissipate heat generated in the drag mechanism. This structure effectively regulates a temperature rise in the drag mechanism.

(3) The spool according to yet another aspect of the present disclosure further includes a tubular support. The support does not rotate with respect to the spool shaft. The spool body rotates with respect to the support. The drag mechanism is arranged between the spool body and the support. The radiator is mounted on the support in a non-rotatable manner.

In this case, the spool body rotates with respect to the spool shaft and the support, with the drag mechanism arranged between the spool body and the support. The radiator in this structure is in contact with the drag mechanism, and can directly dissipate heat generated in the drag mechanism. This structure effectively regulates a temperature rise in the drag mechanism.

(4) In the spool according to a further aspect of the present disclosure, the spool body includes a line winding drum, a front flange and a rear flange, and a tubular portion. A line is to be wound around the line winding drum. The front flange and the rear flange are arranged respectively on front and rear ends of the line winding drum. The tubular portion is arranged on the rear flange. The radiator is arranged inside the tubular portion.

The radiator arranged inside the tubular portion is in contact with the drag mechanism, and can directly dissipate heat generated in the drag mechanism. This structure effectively regulates a temperature rise in the drag mechanism.

(5) In the spool according to yet a further aspect of the present disclosure, the radiator includes a contact member and an extension. The contact member is in contact with the drag mechanism. The extension extends radially outwardly from the contact member. The extension has a first heat discharging hole for discharging heat from the drag mechanism.

In this case, heat in the drag mechanism is transferred to the contact member. Heat in the contact member is then transferred radially outwardly by the extension, and is discharged. Air warmed by the heat in the drag mechanism is discharged through the first heat discharging hole. This structure effectively regulates a temperature rise in the drag mechanism.

(6) In the spool according to an additional aspect of the present disclosure, the drag mechanism includes a first drag plate and a second drag plate. The first drag plate does not rotate with respect to the spool shaft. The second drag plate is in contact with the first drag plate, and does not rotate with respect to the spool body. The radiator is in contact with one of the first drag plate or the second drag plate.

During an operation of the drag mechanism, the first drag plate and the second drag plate, in contact with each other, rotate with respect to each other. When the drag mechanism generates heat, the radiator is in contact with either the first drag plate or the second drag plate. This structure effectively regulates a temperature rise in the drag mechanism.

(7) The spool according to one more aspect of the present disclosure further includes a heat discharger. The heat discharger is arranged inside the spool body and rotates with respect to the radiator to guide internal heat of the spool body radially outwardly in the spool body.

In this case, air warmed by heat in the drag mechanism is guided radially outwardly in the spool body by the heat discharger. This regulates a temperature rise inside the spool body. In other words, this structure more effectively regulates a temperature rise in the drag mechanism.

(8) In the spool according to another aspect of the present disclosure, the heat discharger is mounted on the spool body in an integrally rotatable manner.

When the spool body rotates with respect to the spool shaft, the heat discharger also rotates with respect to the spool shaft. The rotation of the heat discharger guides air warmed by the heat in the drag mechanism radially outwardly in the spool body. This regulates a temperature rise inside the spool body. In other words, this structure more effectively regulates a temperature rise in the drag mechanism.

(9) In the spool according to another aspect of the present disclosure, the spool body includes a line winding drum, a front flange and a rear flange, and a tubular portion. A line is to be wound around the line winding drum. The front flange and the rear flange are arranged respectively on front and rear ends of the line winding drum. The tubular portion is arranged on the rear flange. The heat discharger is mounted on one of the front flange or the rear flange in an integrally rotatable manner. The tubular portion has a second heat discharging hole for discharging internal heat of the spool body out of the spool body.

In this case, air warmed by the heat in the drag mechanism is discharged from the spool body through the second heat discharging hole. This regulates a temperature rise inside the spool body. In other words, this structure more effectively regulates a temperature rise in the drag mechanism.

(10) In the spool according to a further aspect of the present disclosure, the heat discharger includes a plurality of blades. The plurality of blades guide internal heat of the spool body radially outwardly in the spool body.

When the heat discharger rotates, the blades effectively guide internal heat of the spool body radially outwardly in the spool body. This regulates a temperature rise inside the spool body. In other words, this structure more effectively regulates a temperature rise in the drag mechanism.

(11) A spinning reel according to another aspect of the present disclosure includes a spool shaft, and the spool according to any one of the above aspects. The spool is mounted on the spool shaft.

The spinning reel includes the spool according to any of the above aspects, and thus has the same advantageous effects as described above.

The spinning reel spool according to one or more embodiments of the present disclosure effectively regulates a temperature rise in the drag mechanism. Further, the spinning reel according to one or more embodiments of the present disclosure effectively regulates a temperature rise in the drag mechanism.

DETAILED DESCRIPTION

Figure 1:
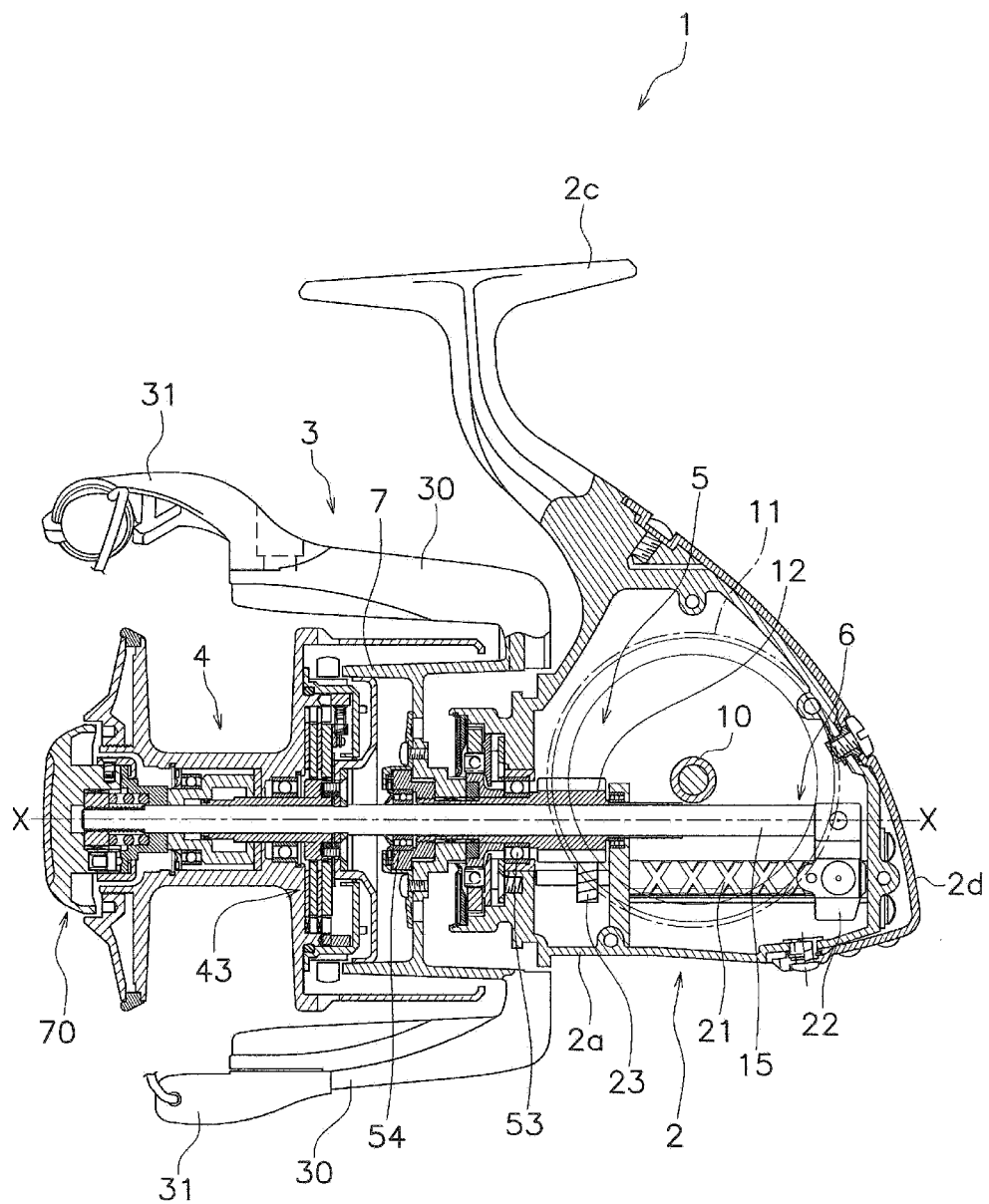
FIG. 1 is a side view of a spinning reel according to one embodiment of the present disclosure.

As shown in FIG. 1, a spinning reel 1 according to one embodiment of the present disclosure includes a reel unit 2, a rotor 3, and a spool 4.

The term "axial direction" used herein refers to the direction in which a spool shaft 15 extends. The axial direction includes a direction parallel to the direction in which the spool shaft 15 extends. The term "frontward" or "front" in the axial direction that may be used herein refers to the direction in which a fishing line is to be reeled out. The term "rearward" or "rear" in the axial direction that may be used herein refers to the direction opposite to the front.

The term "radial direction" or "radially" refers to a direction away from the spool shaft 15. The term "circumferential direction" refers to a direction about the spool shaft 15. With the reel unit 2 mounted on a fishing rod (not shown), the term "upward" that may be used herein refers to a direction radially away from the spool shaft 15 toward the fishing rod, whereas the term "downward" that may be used herein refers to a direction radially away from the fishing rod.

In FIG. 1, the "front" is the left side, and the "rear" is the right side. In FIG. 1, "upward" is the upper side, and "downward" is the lower side.

The axis X of the spool shaft 15 matches the rotation axes of the rotor 3 and a pinion gear 12. In these components, an area around the axis X may be referred to as a central area.

Reel Unit Structure

The reel unit 2 supports a rotatable handle (not shown). The handle can be mounted either on the right or left side of the reel unit 2. As shown in FIG. 1, the reel unit 2 includes a reel body 2a, a lid (not shown), and a reel body guard 2d.

The reel unit 2 further includes a rod holder 2c, which is on top of the reel body 2a and is integral with the reel body 2a. The reel body 2a has its front part arranged inside a rear part of the rotor 3. The spool shaft 15 is mounted in the reel body 2a in a non-rotatable manner and movable back and forth.

A drag adjustment knob 70 (described later) for a drag mechanism 43 is attached to the front end of the spool shaft 15. A slider 22 is fixed to the rear end of the spool shaft 15 in a non-rotatable manner. The rotor 3 is mounted on a middle portion of the spool shaft 15 via the pinion gear 12.

The reel body 2a has an internal space, which contains a rotor drive mechanism 5 and an oscillating mechanism 6. The lid is attached to the reel body 2a to close the internal space of the reel body 2a. The reel body guard 2d is attached to the reel body 2a to cover the rear part of the reel body 2a and the lid.

The rotor drive mechanism 5 includes a face gear 11 and the pinion gear 12. The face gear 11 rotates together with a master gear shaft 10, to which the handle is fixed. The pinion gear 12 is tubular, and receives the spool shaft 15 inserted through it. The pinion gear 12 meshes with the face gear 11. The pinion gear 12 rotates in conjunction with the rotation of the face gear 11.

The pinion gear 12 extends through the central area of the rotor 3, and is fixed to the rotor 3 with a nut. The pinion gear 12 is supported on the reel body 2a in a rotatable manner via a first bearing 53 and a second bearing 54.

The oscillating mechanism 6 moves the spool 4 and the spool shaft 15 in the axial direction. The oscillating mechanism 6 includes a worm shaft 21, the slider 22, and an intermediate gear 23. The worm shaft 21 is arranged on the reel body 2a in a rotatable manner. The worm shaft 21 is arranged below the spool shaft 15 and extends parallel to the spool shaft 15.

The slider 22 is fixed to the rear end of the spool shaft 15 in a non-rotatable manner. The slider 22 is engaged with the worm shaft 21. The intermediate gear 23 is fixed to the front end of the worm shaft 21. The intermediate gear 23 meshes with the pinion gear 12.

When the face gear 11 rotates, the pinion gear 12 rotates. The worm shaft 21 then rotates via the intermediate gear 23 that meshes with the pinion gear 12. The rotating worm shaft 21 causes the slider 22 to reciprocate in the axial direction along the worm shaft 21. This reciprocation causes the spool shaft 15 to reciprocate in the axial direction.

Rotor Structure

The rotor 3 is supported on the reel unit 2 in a rotatable manner. The rotor 3 rotates about the spool shaft 15.

The rotor 3 includes a rotor unit 7, a pair of rotor arms 30, and a bail arm 31. The rotor unit 7 is supported on the reel unit 2 in a rotatable manner. In detail, the rotor unit 7 is substantially tubular. The rotor unit 7 is connected to the pinion gear 12 in a non-rotatable manner, and rotates together with the pinion gear 12. The pair of rotor arms 30 is integral with the rotor unit 7. The bail arm 31 pivots between a line guiding position (position shown in FIG. 1) and a line releasing position reversed from the line guiding position.

Spool Structure

Figure 2:
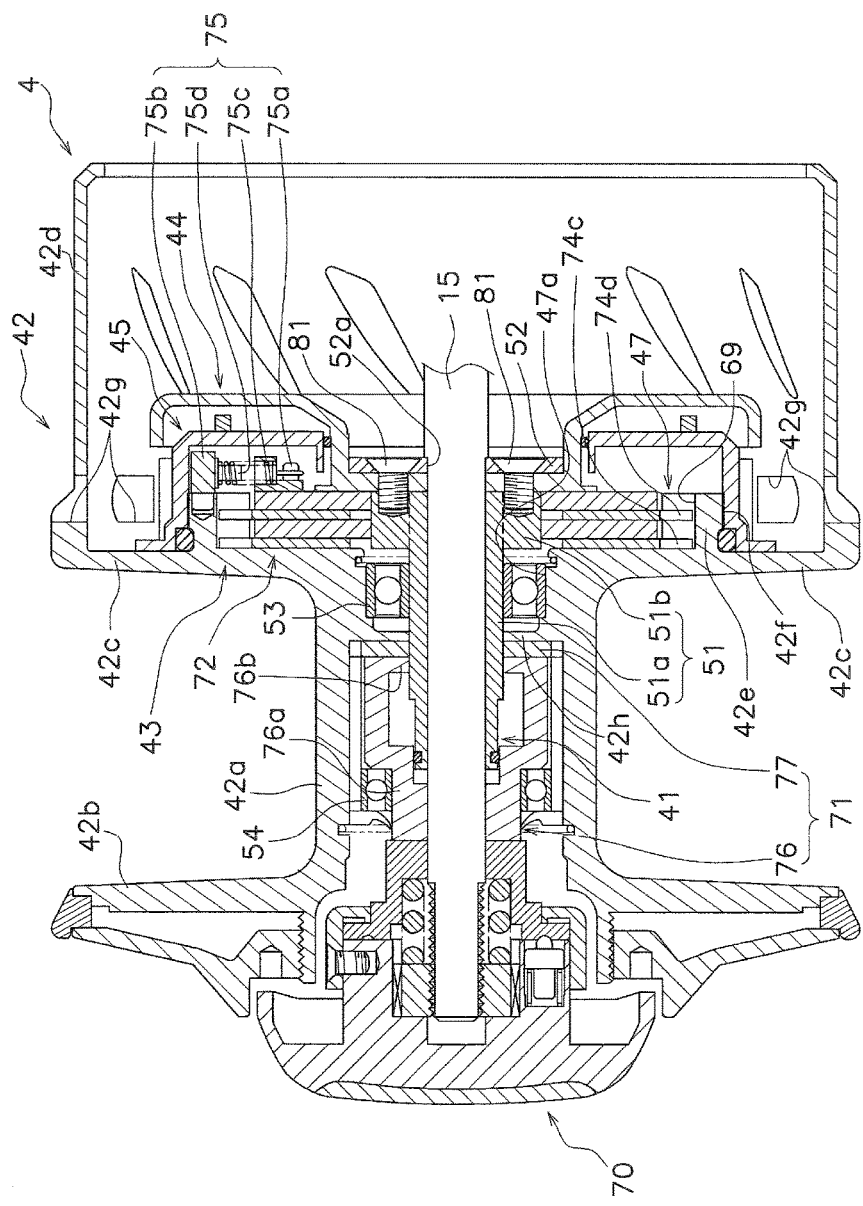
FIG. 2 is an enlarged cross-sectional view of a front part of the spinning reel.

As shown in FIG. 2, the spool 4 is on the front part of the rotor 3 and is movable in the axial direction. The spool 4 is arranged between the two rotor arms 30 of the rotor 3. The spool 4 is mounted on the spool shaft 15. The spool 4 is moved by the oscillating mechanism 6 to reciprocate in the axial direction together with the spool shaft 15.

As shown in FIG. 2, the spool 4 includes a support 41, a spool body 42, the drag mechanism 43, a heat sink 44 (an example of a radiator), and a heat discharging cover 45 (an example of a heat discharger).

Support

The support 41 is mounted on the spool shaft 15 in a non-rotatable manner, and is movable in the axial direction together with the spool shaft 15.

Figure 3:
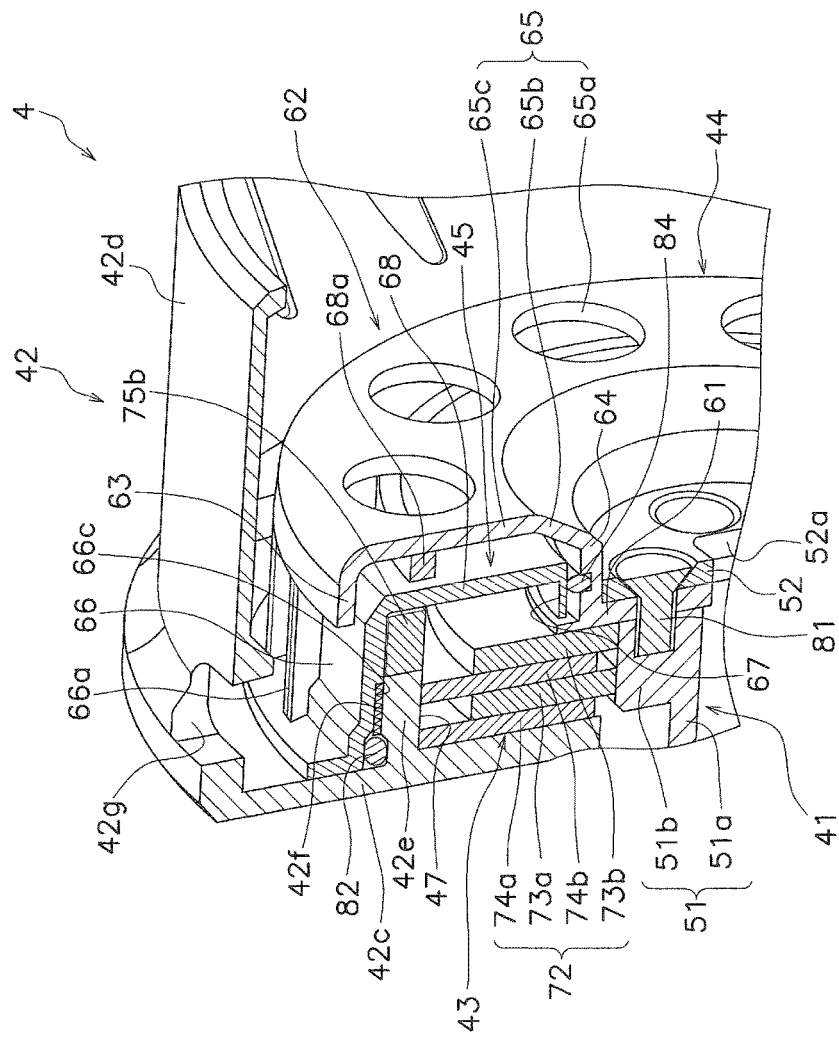
FIG. 3 is an enlarged partial perspective view of a skirt of the spinning reel.

As shown in FIGS. 2 and 3, the support 41 includes a support body 51 and a restrictor 52. The support body 51 includes a tubular bearing mount 51a and a plurality of protrusions 51b. The bearing mount 51a supports the spool body 42 in a rotatable manner via the first bearing 53.

The plurality of (e.g., four) protrusions 51b are arranged on an end (rear end) of the bearing mount 51a. The protrusions 51b are arranged at predetermined intervals in the circumferential direction. Each protrusion 51b extends radially from the bearing mount 51a. The protrusions 51b are, for example, cross-shaped as viewed in the axial direction. The protrusions 51b retain a friction member 72 (first drag washers 73a and 73b described later) included in the drag mechanism 43.

The restrictor 52 is fixed to the protrusions 51b. The restrictor 52 restricts the rotation of the support body 51 with respect to the spool shaft 15. The restrictor 52 is fixed to an end (rear end) of the support body 51. More specifically, the restrictor 52 is fixed to the protrusions 51b of the support body 51 with fixing bolts 81.

The restrictor 52 is mounted on the spool shaft 15 in a non-rotatable manner. More specifically, the restrictor 52 has a hole 52a, in which the spool shaft 15 is noncircularly engaged. This retains the restrictor 52 on the spool shaft 15 in a non-rotatable manner. This structure retains the support body 51 on the spool shaft 15 in a non-rotatable manner via the restrictor 52.

The restrictor 52 also retains the friction member 72 included in the drag mechanism 43 in the axial direction. More specifically, the restrictor 52 is fixed to the protrusions 51b of the support body 51 via the heat sink 44 (contact member 61 described later) in the manner described above. This structure restricts rearward movement of the friction member 72. The friction member 72 is supported between the restrictor 52 and a rear flange 42c (described later) via the heat sink 44 (contact member 61 described later).

Spool Body

The spool body 42 is mounted on the support 41 in a rotatable manner. As shown in FIG. 2, the spool body 42 includes a tubular line winding drum 42a, a pair of flanges (a front flange 42b and a rear flange 42c), and a tubular skirt 42d (an example of a tubular portion).

The line winding drum 42a allows a fishing line to be wound around an outer peripheral surface of the line winding drum 42a. As shown in FIG. 2, the line winding drum 42a contains the second bearing 54 in a front part of the line winding drum 42a. The second bearing 54 is arranged between the line winding drum 42a and a pressing member 76 (described later) included in a drag transfer mechanism 71. The line winding drum 42a is supported on the pressing member 76 of the drag transfer mechanism 71 in a rotatable manner via the second bearing 54. The pressing member 76 is retained on the spool shaft 15 in a non-rotatable manner. Thus, the line winding drum 42a is supported on the spool shaft 15 in a rotatable manner via the second bearing 54.

The line winding drum 42a includes a wall 42h. The wall 42h is integral with the line winding drum 42a, and protrudes inwardly from the inner surface of the line winding drum 42a. The line winding drum 42a further contains the first bearing 53 in a rear part of the line winding drum 42a. The first bearing 53 is arranged between the line winding drum 42a and the support body 51 of the support 41. As a result, the line winding drum 42a is supported on the support body 51 of the support 41 in a rotatable manner via the first bearing 53. The support body 51 is retained on the spool shaft 15 in a non-rotatable manner via the restrictor 52. As a result, the line winding drum 42a is supported on the spool shaft 15 in a rotatable manner via the first bearing 53.

The front and rear flanges 42b and 42c are arranged separately on the front and rear ends of the line winding drum 42a. The front and rear flanges 42b and 42c are each substantially annular.

The front flange 42b is integral with the line winding drum 42a. The rear flange 42c is integral with the line winding drum 42a. The rear flange 42c has its rear surface integral with a tubular rear drag mount 42e. For example, the rear drag mount 42e is arranged inside the skirt 42d and is spaced from the skirt 42d. The rear drag mount 42e has a male thread 42f on an outer peripheral surface of the rear drag mount 42e.

As shown in FIGS. 2 and 3, the rear drag mount 42e and the rear flange 42c define a housing recess 47. The housing recess 47 opens rearward, and contains the friction member 72 of the drag mechanism 43. The housing recess 47 has a bottom hole 47a, which communicates with the inner wall surface of the line winding drum 42a.

The housing recess 47 has a plurality of (e.g., four) engagement grooves 69. The engagement grooves 69 are formed on the inner wall surface of the housing recess 47. More specifically, the engagement grooves 69 each extend in the axial direction on the inner wall surface of the housing recess 47. The engagement grooves 69 are spaced from one another in the circumferential direction on the inner wall surface of the housing recess 47. The engagement grooves 69 retain the friction member 72 (second drag washers 74a and 74b described later) included in the drag mechanism 43 in a non-rotatable manner.

The skirt 42d extends rearward from the rear flange 42c. The skirt 42d is substantially tubular. The skirt 42d has a plurality of second heat discharging holes 42g. The second heat discharging holes 42g allow internal heat of the spool body 42 to be discharged out of the spool body 42. The second heat discharging holes 42g are arranged at predetermined intervals in the circumferential direction. Each second heat discharging hole 42g extends radially through the skirt 42d.

Drag Mechanism

The drag mechanism 43 applies a braking force against a rotation of the spool body 42. Thus, the drag mechanism 43 is an exemplary means for applying a braking force. As shown in FIG. 2, the drag mechanism 43 is arranged on the inner periphery of the spool body 42. The drag mechanism 43 is mounted between the spool body 42 and the spool shaft 15. More specifically, the drag mechanism 43 is arranged between the spool body 42 and the support 41 (support body 51).

The drag mechanism 43 includes the drag adjustment knob 70, the drag transfer mechanism 71, the friction member 72, and a sounding mechanism 75. The drag adjustment knob 70 is mounted on the distal end of the spool shaft 15.

The drag transfer mechanism 71 is arranged in a front part of the line winding drum 42a. The drag transfer mechanism 71 includes the pressing member 76 and a slide 77.

The pressing member 76 is pressed by the drag adjustment knob 70. The pressing member 76 is arranged between the drag adjustment knob 70 and the slide 77 in the axial direction.

The pressing member 76 includes a tubular portion 76a and a collar 76b. The tubular portion 76a is substantially cylindrical. The tubular portion 76a is pressed by the drag adjustment knob 70. The second bearing 54 is arranged on the outer periphery of the tubular portion 76a. The tubular portion 76a receives the spool shaft 15 inserted through a front part of the tubular portion 76a. The tubular portion 76a has its inner peripheral surface noncircularly engaged with the spool shaft 15, and thus is retained on the spool shaft 15 in a non-rotatable manner. The tubular portion 76a receives the spool shaft 15 inserted through a rear part of the tubular portion 76a arranged via the bearing mount 51a of the support body 51.

The collar 76b is arranged on the tubular portion 76a. More specifically, the collar 76b protrudes radially inwardly from the rear end of the tubular portion 76a. The collar 76b is in contact with the slide 77 in the axial direction. When, for example, the tubular portion 76a is pressed by the drag adjustment knob 70, the slide 77 is supported between the collar 76b and the wall 42h of the line winding drum 42a.

The slide 77 is arranged between the pressing member 76 and the rear flange 42c of the line winding drum 42a. The slide 77, which is supported between the pressing member 76 (collar 76b) and the wall 42h of the line winding drum 42a, permits a relative rotation of the pressing member 76 and a flange of the line winding drum 42a. The slide 77 is an annular member, such as a washer.

The friction member 72 applies a braking force against a rotation of the spool body 42. As shown in FIGS. 2 and 3, the friction member 72 is arranged on the inner periphery of the skirt 42d included in the spool body 42. The friction member 72 is arranged between the spool body 42 and the restrictor 52.

The friction member 72 includes one or more (e.g., two) first drag washers 73a and 73b (an example of a first drag plate) and one or more (e.g., two) second drag washers 74a and 74b (an example of a second drag plate).

The first drag washers 73a and 73b and the second drag washers 74a and 74b are housed in the housing recess 47. The first drag washers 73a and 73b and the second drag washers 74a and 74b are arranged alternately in the axial direction. The first drag washers 73a and 73b and the second drag washers 74a and 74b are supported between the spool body 42 and the restrictor 52. More specifically, the first drag washers 73a and 73b and the second drag washers 74a and 74b are supported between the rear flange 42c of the spool body 42 and the restrictor 52.

The first drag washers 73a and 73b are mounted on the support body 51 in a non-rotatable manner. The first drag washers 73a and 73b are retained in a non-rotatable manner by the protrusions 51b included in the support body 51. More specifically, the first drag washers 73a and 73b have holes (not shown) in correspondence with the outer diameters of the protrusions 51b. The holes are cross-shaped. The protrusions 51b are fitted in these holes to retain the first drag washers 73a and 73b on the spool shaft 15 in a non-rotatable manner.

The first drag washer 73b is in contact with the heat sink 44 (contact member 61 described later). The restrictor 52 restricts a rearward movement of the first drag washer 73b via the heat sink 44 (contact member 61). The first drag washer 73b is pressed by the restrictor 52 via the heat sink 44 (contact member 61).

The second drag washers 74a and 74b and the first drag washers 73a and 73b rotate with respect to each other to generate a drag force. The second drag washers 74a and 74b are mounted on the housing recess 47 in a non-rotatable manner. More specifically, each of the second drag washers 74a and 74b has a plurality of lugs 74c and 74d (refer to FIG. 2). The lugs 74c and 74d are engaged in the engagement grooves 69 of the rear drag mount 42e. This engagement causes the second drag washers 74a and 74b to be non-rotatable with respect to the spool body 42 and rotatable with respect to the spool shaft 15. The second drag washer 74a is in contact with the rear surface of the rear flange 42c included in the spool body 42, and is pressed by the rear flange 42c included in the spool body 42.

The sounding mechanism 75 sounds during operation of the friction member 72. As shown in FIG. 2, the sounding mechanism 75 includes a spring mount 75a, a sounding unit 75b, a spring 75c, and a sounding pin 75d.

The spring mount 75a is mounted on the rear surface of the first drag washer 73b. The sounding unit 75b is mounted on the spool body 42, or specifically on, for example, the rear drag mount 42e. The sounding unit 75b is substantially cylindrical. The sounding unit 75b has a plurality of recesses on its inner periphery. The recesses are arranged at predetermined intervals in the circumferential direction on the inner periphery of the sounding unit 75b.

The spring 75c is, for example, a coil spring. The spring 75c has one end set on the spring mount 75a, and its other end pressing the head of the sounding pin 75d. The sounding pin 75d has its shaft arranged at the inner periphery of the spring 75c, and its head to be engaged with the recesses of the sounding unit 75b.

As the spool body 42 (rear drag mount 42e) rotates with respect to the first drag washer 73b of the friction member 72, the head of the sounding pin 75*d* comes in contact with the recesses of the sounding unit 75*b* successively. This successive contact produces sound.

Heat Sink

The heat sink 44 dissipates heat generated in the drag mechanism 43. As such, the heat sink 44 is an exemplary means for dissipating heat. As shown in FIGS. 2 and 3, the heat sink 44 is arranged in contact with the friction member 72 inside the spool body 42, or for example, inside the skirt 42*d*. The heat sink 44 is formed from a material having substantially the same thermal conductivity as the material for the friction member 72, which is, for example, the first drag washer 73*b*. The heat sink 44 is non-rotatable with respect to the spool shaft 15, and is rotatable with respect to the spool body 42.

More specifically, the heat sink 44 includes the contact member 61 and an extension 62 as shown in FIG. 3. The contact member 61 comes in contact with the friction member 72. The contact member 61 is substantially annular. The contact member 61 comes in contact with the first drag washer 73*b* included in the friction member 72. In this state, the contact member 61 is arranged between the restrictor 52 and the protrusions 51*b* of the support body 51 in the axial direction. The contact member 61, together with the restrictor 52, is fixed to the protrusions 51*b* of the support body 51 with the fixing bolts 81.

The extension 62 extends radially outwardly from the contact member 61. The extension 62 includes a first outer tube portion 63, a first inner tube portion 64, and a first connecting portion 65.

The first outer tube portion 63 is substantially tubular. The first outer tube portion 63 is integral with the outer periphery of the first connecting portion 65, and extends toward the rear flange 42*c*. The first inner tube portion 64 is substantially tubular, and is arranged inside the first outer tube portion 63. The first inner tube portion 64 is integral with the inner periphery of the first connecting portion 65. The first inner tube portion 64 extends toward the contact member 61.

The first connecting portion 65 connects the first inner tube portion 64 and the first outer tube portion 63 in the radial direction. The first connecting portion 65 is substantially annular. In detail, the first connecting portion 65 includes an annular plate 65*c*, an annular slope 65*b*, and a plurality of first heat discharging holes 65*a*.

The annular plate 65*c* is a substantially annular plate. The outer periphery of the annular plate 65*c* is integral with the first outer tube portion 63. The slope 65*b* is integral with the inner periphery of the annular plate 65*c* and the first inner tube portion 64. The slope 65*b* is inclined from the inner periphery of the annular plate 65*c* toward the contact member 61.

The first heat discharging holes 65*a* allow air warmed by heat generated in the friction member 72 to be discharged. Thus, the first heat discharging holes 65*a* are an exemplary means for allowing heat to be discharged. The first heat discharging holes 65*a* are formed in the first connecting portion 65. More specifically, the first heat discharging holes 65*a* are formed in the annular plate 65*c*. Each first heat discharging hole 65*a* is substantially circular. The first heat discharging holes 65*a* extend through the annular plate 65*c* in the axial direction. The first heat discharging holes 65*a* are spaced from one another in the circumferential direction.

In the heat sink 44 described above, the contact member 61 is fixed to the protrusions 51*b* of the support body 51, together with the restrictor 52, which is non-rotatable with respect to the spool shaft 15. As a result, the contact member 61 is non-rotatable with respect to the spool shaft 15. The heat sink 44 is thus non-rotatable with respect to the spool shaft 15.

In this state, a relative rotation of the spool body 42 with respect to the heat sink 44 and the spool shaft 15 activates the drag mechanism 43. The resultant heat generated in the friction member 72 of the drag mechanism 43 is then transferred to the contact member 61 (heat sink 44). Heat is further transferred from the contact member 61 to the extension 62 (heat sink 44). In this manner, heat in the friction member 72 is transferred to the heat sink 44, which dissipates heat. Also, the heat generated in the friction member 72 warms the air surrounding the friction member 72. Air warmed by the friction member 72 is then discharged through the first heat discharging holes 65*a* of the heat sink 44.

Heat Discharging Cover

The heat discharging cover 45 guides air warmed by the heat generated in the friction member 72 radially outwardly from the spool body 42. The heat discharging cover 45 covers the friction member 72, and prevents foreign matter from entering the friction member 72.

As shown in FIG. 2, the heat discharging cover 45 is attached to the spool body 42 in an integrally rotatable manner. The heat discharging cover 45 is arranged inside the spool body 42, or for example, inside the skirt 42*d* between the rear flange 42*c* and the heat sink 44 in the axial direction. The heat discharging cover 45 is arranged between the friction member 72 and the heat sink 44 in the axial direction.

The heat discharging cover 45 includes a second outer tube portion 66, a second inner tube portion 67, and a second connecting portion 68 as shown in FIG. 3. The second outer tube portion 66 is substantially tubular. The second outer tube portion 66 is integral with the outer periphery of the second connecting portion 68. The second outer tube portion 66 extends from the outer periphery of the second connecting portion 68 toward the rear flange 42*c*.

The second outer tube portion 66 is mounted on the outer periphery of the rear drag mount 42*e* of the rear flange 42*c*. More specifically, a first sealing member 82 is arranged between the inner periphery of the second outer tube portion 66 and the outer periphery of the rear drag mount 42*e*. The second outer tube portion 66 has a female thread 66*c* on its inner peripheral surface. The female thread 66*c* is screwed with the male thread 42*f* of the rear drag mount 42*e*. The second outer tube portion 66 is thus mounted on the rear flange 42*c* in an integrally rotatable manner.

The second outer tube portion 66 has a plurality of blades 66*a*. The blades 66*a* guide internal heat of the spool body 42 radially outwardly. Thus, the blades 66*a* are exemplary means for guiding heat of the spool body radially outwardly. The blades 66*a* are arranged on the outer periphery of the second outer tube portion 66.

More specifically, each blade 66*a* protrudes outwardly from the outer periphery of the second outer tube portion 66. Each blade 66*a*, which protrudes outwardly from the outer periphery of the second outer tube portion 66, has its distal end displaced from its basal end in the rotational direction of the spool body 42. Each blade 66*a* extends in the axial direction on the outer periphery of the second outer tube portion 66. The blades 66*a* are spaced from one another in the circumferential direction on the outer periphery of the second outer tube portion 66.

The second inner tube portion 67, which is substantially tubular, is arranged inside the second outer tube portion 66. The second inner tube portion 67 is integral with the inner periphery of the second connecting portion 68. The second inner tube portion 67 extends from the inner periphery of the second connecting portion 68 toward the contact member 61.

The second connecting portion 68 connects the second inner tube portion 67 and the second outer tube portion 66 in the radial direction. The second connecting portion 68 is substantially annular. The second connecting portion 68 is arranged between the friction member 72 and the first connecting portion 65 of the heat sink 44 in the axial direction. The sounding mechanism 75 described above (refer to FIG. 2) is arranged between the friction member 72 and the second connecting portion 68 in the axial direction. The second connecting portion 68 has a protrusion 68a. The protrusion 68a protrudes from the second connecting portion 68 toward the first connecting portion 65 of the heat sink 44.

The sounding mechanism 75 described above (refer to FIG. 2) is arranged between the second outer tube portion 66 and the second inner tube portion 67 in the radial direction. A second sealing member 84 is arranged between the inner peripheral surface of the second inner tube portion 67 and the outer peripheral surface of the first inner tube portion 64 of the heat sink 44. The first and second sealing members 82 and 84, the heat discharging cover 45, and the heat sink 44 prevent foreign matter from entering the friction member 72.

The heat discharging cover 45 described above includes the second outer tube portion 66 rotatable integrally with the rear flange 42c (rear drag mount 42e) of the spool body 42. This structure allows the heat discharging cover 45 to rotate integrally with the spool body 42.

In this state, a rotation of the spool body 42 activates the drag mechanism 43. The heat discharging cover 45 also rotates together with the spool body 42. The spool body 42 and the heat discharging cover 45 then rotate with respect to the heat sink 44 and the spool shaft 15. The blades 66a of the heat discharging cover 45 guide air warmed by the friction member 72 of the drag mechanism 43 to the second heat discharging holes 42g of the skirt 42d. Air is then discharged out of the skirt 42d through the second heat discharging holes 42g. Thus, the second heat discharging holes are exemplary means for allowing heat to be discharged.

Features

The above embodiment can be expressed in the following forms.

(1) A spool 4 for a spinning reel 1 is mountable on a spool shaft 15. The spool 4 includes a spool body 42, a drag mechanism 43, and a heat sink 44. The spool body 42 is rotatable with respect to the spool shaft 15. The drag mechanism 43 is arranged between the spool body 42 and the spool shaft 15. The drag mechanism 43 applies a braking force against a rotation of the spool body 42. The heat sink 44 is arranged in the spool body 42 and is in contact with the drag mechanism 43. The heat sink 44 is rotatable with respect to the spool body 42, and is non-rotatable with respect to the spool shaft 15.

In this spool 4, a relative rotation of the spool body 42 with respect to the spool shaft 15 activates the drag mechanism 43. The heat sink 44 in contact with the drag mechanism 43 then dissipates heat generated in the drag mechanism 43. In this manner, the heat sink 44 in the spool 4 can directly dissipate heat generated in the drag mechanism 43. This structure effectively regulates a temperature rise in the drag mechanism 43.

(2) In the spool 4 in the spinning reel 1, the heat sink 44 can rotate with respect to the spool body 42 and does not rotate with respect to the spool shaft 15.

In this case, the spool body 42 rotates with respect to the spool shaft 15 and the heat sink 44. The heat sink 44 in this structure is in contact with the drag mechanism 43, and can directly dissipate heat generated in the drag mechanism 43. This structure effectively regulates a temperature rise in the drag mechanism 43.

(3) The spool 4 in the spinning reel 1 can further include a tubular support 41. The support 41 does not rotate with respect to the spool shaft 15. The spool body 42 rotates with respect to the support 41. The drag mechanism 43 is arranged between the spool body 42 and the support 41. The heat sink 44 is mounted on the support 41 in a non-rotatable manner.

In this case, the spool body 42 rotates with respect to the spool shaft 15 and the support 41, with the drag mechanism 43 arranged between the spool body 42 and the support 41. The heat sink 44 in this structure is in contact with the drag mechanism 43, and can directly dissipate heat generated in the drag mechanism 43. This structure effectively regulates a temperature rise in the drag mechanism 43.

(4) In the spool 4 in the spinning reel 1, the spool body 42 can include a line winding drum 42a, a front flange 42b and a rear flange 42c, and a skirt 42d. A line is to be wound around the line winding drum 42a. The front flange 42b and the rear flange 42c are arranged respectively on front and rear ends of the line winding drum 42a. The skirt 42d is arranged on the rear flange 42c. The heat sink 44 is arranged inside the skirt 42d.

The heat sink 44 arranged inside the skirt 42d is in contact with the drag mechanism 43, and can directly dissipate heat generated in the drag mechanism 43. This structure effectively regulates a temperature rise in the drag mechanism 43.

(5) In the spool 4 in the spinning reel 1, the heat sink 44 can include a contact member 61 and an extension 62. The contact member 61 is in contact with the drag mechanism 43. The extension 62 extends radially outwardly from the contact member 61. The extension 62 has a first heat discharging hole 65a for discharging heat from the drag mechanism 43.

In this case, heat in the drag mechanism 43 is transferred to the contact member 61. Heat in the contact member 61 is then transferred radially outwardly by the extension 62, and is discharged. Air warmed by the heat in the drag mechanism 43 is discharged through the first heat discharging hole 65a. This structure effectively regulates a temperature rise in the drag mechanism 43.

(6) In the spool 4 in the spinning reel 1, the drag mechanism 43 can include first drag washers 73a and 73b and second drag washers 74a and 74b. The first drag washers 73a and 73b do not rotate with respect to the spool shaft 15. The second drag washers 74a and 74b are in contact with the first drag washers 73a and 73b, and do not rotate with respect to the spool body 42. The heat sink 44 is in contact with the first drag washer 73b.

During operation of the drag mechanism 43, the first drag washers 73a and 73b and the second drag washers 74a and 74b, in contact with each other, rotate with respect to each other. When the drag mechanism 43 generates heat, the heat sink 44 is in contact with the first drag washer 73b. This structure effectively regulates a temperature rise in the drag mechanism 43.

(7) The spool 4 in the spinning reel 1 can further include a heat discharging cover 45. The heat discharging cover 45 is arranged inside the spool body 42 and rotates with respect to the heat sink 44 to guide internal heat of the spool body 42 radially outwardly.

In this case, air warmed by the heat in the drag mechanism 43 is guided radially outwardly in the spool body 42 by the heat discharging cover 45. This guidance outward regulates a temperature rise inside the spool body 42. In other words, this structure more effectively regulates a temperature rise in the drag mechanism 43.

(8) In the spool 4 in the spinning reel 1, the heat discharging cover 45 can be mounted on the spool body 42 in an integrally rotatable manner.

When the spool body 42 rotates with respect to the spool shaft 15, the heat discharging cover 45 also rotates with respect to the spool shaft 15. The rotation of the heat discharging cover 45 guides air warmed by the heat in the drag mechanism 43 radially outwardly in the spool body 42. This guidance outward regulates a temperature rise inside the spool body 42. In other words, this structure more effectively regulates a temperature rise in the drag mechanism 43.

(9) In the spool 4 in the spinning reel 1, the spool body 42 includes a line winding drum 42a, a front flange 42b and a rear flange 42c, and a skirt 42d. A line is to be wound around the line winding drum 42a. The front flange 42b and the rear flange 42c are arranged respectively on front and rear ends of the line winding drum 42a. The skirt 42d is arranged on the rear flange 42c. The heat discharging cover 45 is mounted on the rear flange 42c in an integrally rotatable manner. The skirt 42d has a second heat discharging hole 42g for discharging internal heat of the spool body 42 out of the spool body 42.

In this case, air warmed by the heat in the drag mechanism 43 is discharged from the spool body 42 through the second heat discharging hole 42g. This discharge regulates a temperature rise inside the spool body 42. In other words, this structure more effectively regulates a temperature rise in the drag mechanism 43.

(10) In the spool 4 in the spinning reel 1, the heat discharging cover 45 can include a plurality of blades 66a. The plurality of blades 66a guide internal heat of the spool body 42 radially outwardly in the spool body 42.

When the heat discharging cover 45 rotates, the blades 66a effectively guide internal heat of the spool body 42 radially outwardly in the spool body 42. This guidance outward regulates a temperature rise inside the spool body 42. In other words, this structure more effectively regulates a temperature rise in the drag mechanism 43.

(11) A spinning reel 1 includes a spool shaft 15, and the spool 4 in any one of the above examples. The spool 4 is mounted on the spool shaft 15.

The spinning reel 1 includes the spool 4 in any one of the above examples, and thus has the same advantageous effects as described above.

Other Embodiments (a) In the above embodiment, the heat sink 44 is in contact with the first drag washer 73b. In some embodiments, the first drag washers 73a and 73b and the second drag washers 74a and 74b are rearranged in the axial direction. For example, the heat sink 44 is in contact with the second drag washer 74b. This structure also has the same advantageous effects as described above.

(b) In the above embodiment, the heat sink 44 rotates with respect to the spool body 42 and does not rotate with respect to the spool shaft 15. In some embodiments, the heat sink 44 rotates with respect to the spool shaft 15 and does not rotate with respect to the spool body 42. This structure also has the same advantageous effects as described above.

Figure 4:
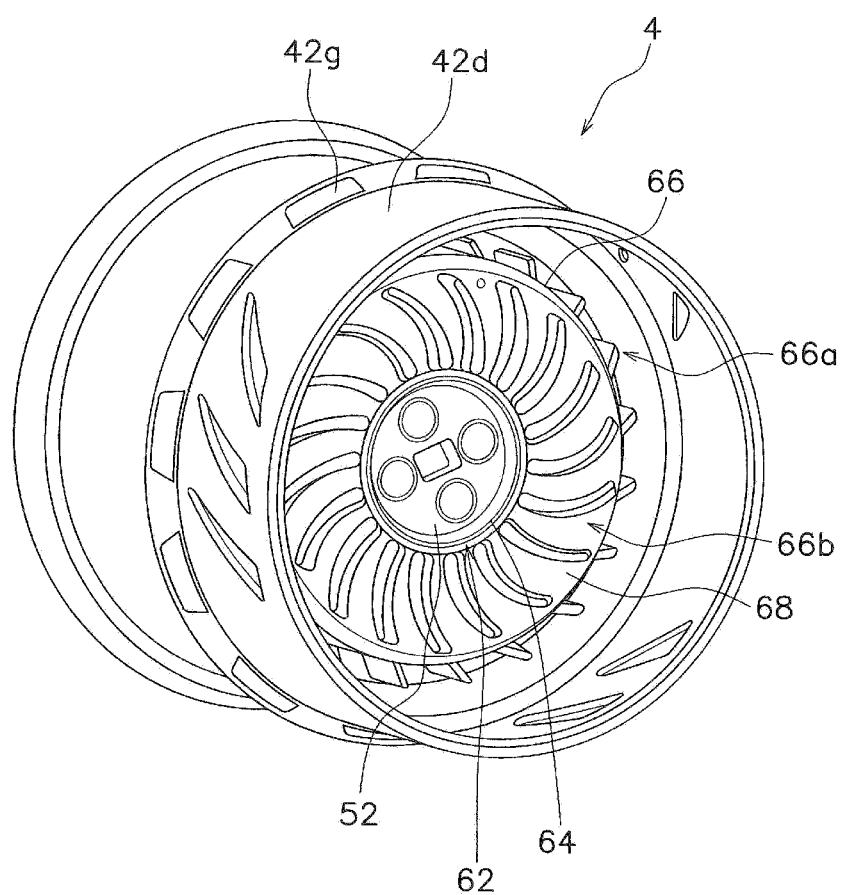
FIG. 4 is a perspective rear view of a spinning reel spool according to another embodiment.

(c) In the above embodiment, the second outer tube portion 66 of the heat discharging cover 45 has the plurality of blades 66a. The second connecting portion 68 of the heat discharging cover 45 can additionally have a plurality of blades 66b as shown in FIG. 4. Hereafter, the blades 66a on the second outer tube portion 66 are referred to as the first blades 66a, and the blades 66b on the second connecting portion 68 are referred to as the second blades 66b.

The second connecting portion 68 has the second blades 66b, which protrude in the axial direction and can extend radially. The second blades 66b can be spaced from one another in the circumferential direction. Alternatively, the second blades 66b can extend circumferentially and be spaced from one another in the radial direction. Each second blade 66b can be arc-shaped.

The heat sink 44 includes the contact member 61 (refer to FIG. 3) and the extension 62. The contact member 61 has substantially the same structure as in the above embodiment, and will not be described.

The extension 62 includes the first inner tube portion 64. In this case, the extension 62 eliminates the first outer tube portion 63 and the first connecting portion 65 described in the above embodiment. The first inner tube portion 64 is integral with the contact member 61, and extends rearward from the contact member 61. The first inner tube portion 64 is arranged inside the second connecting portion 68 and inside the second inner tube portion 67.

When the heat discharging cover 45 rotates together with the spool body 42 with respect to the spool shaft 15 during operation of the drag mechanism 43, the second blades 66b guide air warmed by the heat sink 44 (first inner tube portion 64) radially outwardly.

Air is then guided by the first blades 66a toward the skirt 42d of the spool body 42. Air inside of the spool body 42 is then discharged out of the spool body 42 through the second heat discharging holes 42g of the skirt 42d. This structure smoothly discharges air warmed by the heat generated in the friction member 72.

Figure 5:
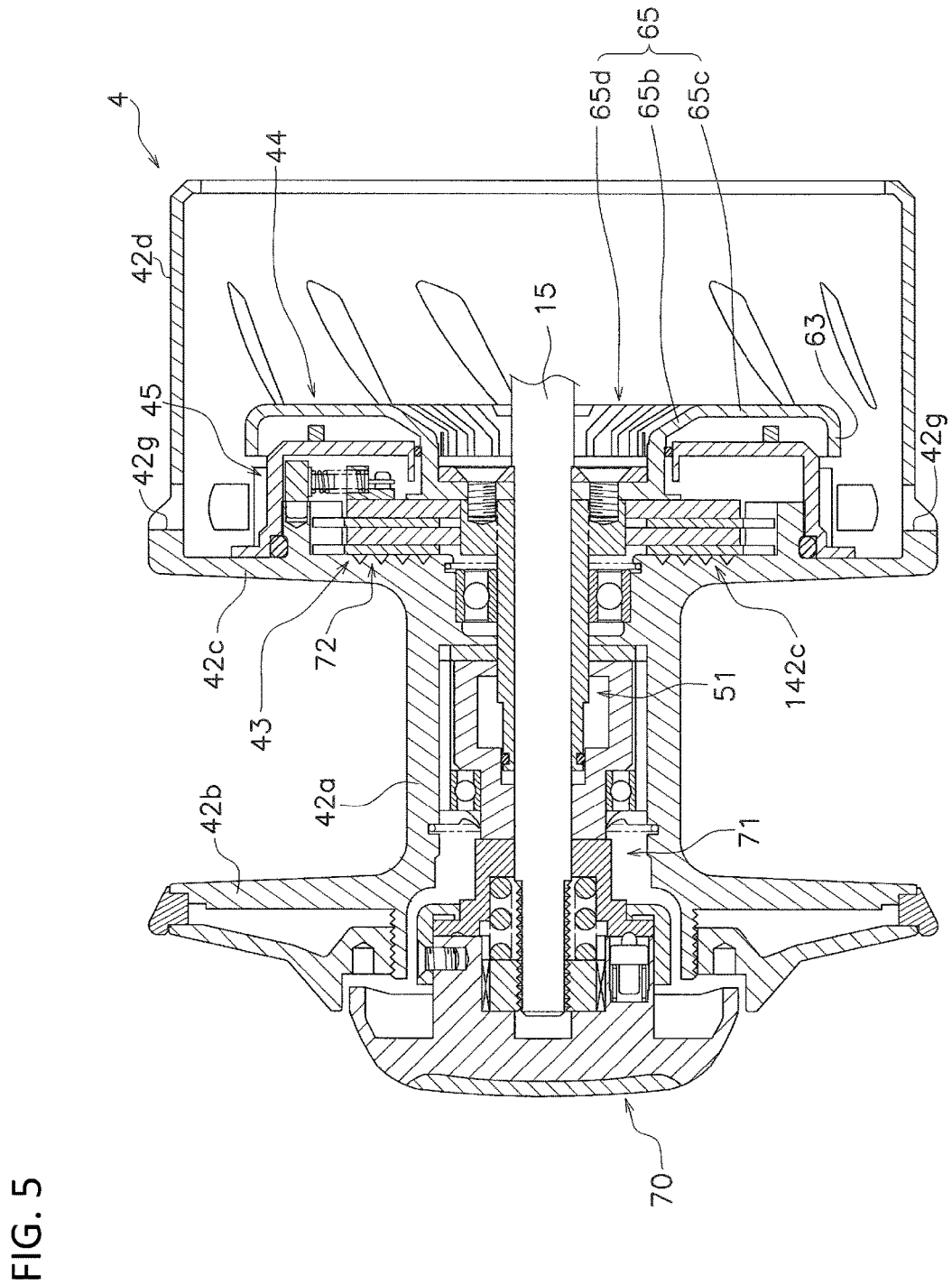
FIG. 5 is an enlarged cross-sectional view of a front part of a spinning reel according to another embodiment.

(d) In the above embodiment, the heat sink 44 has the first heat discharging holes 65a. In some embodiments, the heat sink 44 can have a plurality of slits 65d (an example of a first heat discharging hole) as shown in FIG. 5.

In this heat sink 44, for example, the first connecting portion 65 (the annular plate 65c and the slope 65b) and the first outer tube portion 63 in the extension 62 have the slits 65d. Each slit 65d extends radially in the first connecting portion 65 and in the axial direction in the first outer tube portion 63. The heat sink 44 with these slits 65d also discharges air warmed by the heat generated in the friction member 72 in the same manner as in the above embodiment.

(e) In the above embodiment, the rear flange 42c has a substantially flat rear surface. In some embodiments, the rear flange 42c can have a plurality of grooves 142c on its rear surface as shown in FIG. 5.

In this case, the rear flange 42c has the plurality of grooves 142c facing the friction member 72 (second drag washer 74a) of the drag mechanism 43. Each groove 142c extends in the circumferential direction on the rear surface of the rear flange 42c. The grooves 142c are radially spaced from one another on the rear surface of the rear flange 42c. Each groove 142c has a substantially V-shaped cross-section. The grooves 142c on the rear surface of the rear flange 42c reduce the amount of heat transferred from the friction member 72 of the drag mechanism 43 toward the spool body 42.

(f) In the above embodiment, the slide 77 is a washer. In some embodiments, the slide 77 can function as the drag mechanism 43. In this case, the drag mechanism 43 includes a first friction member (the friction member 72 in the above embodiment) and a second friction member (the slide 77 in the above embodiment). The second friction member includes a plurality of drag washers in the same manner as the friction member 72 described in the above embodiment. This structure also has the same advantageous effects as described above.

What is claimed is:

1. A spool for a spinning reel mountable on a spool shaft, the spool comprising:
   a spool body that rotates with respect to the spool shaft;
   a drag mechanism between the spool body and the spool shaft to apply a braking force against a rotation of the spool body; and
   a radiator in the spool body and in contact with the drag mechanism, the radiator to rotate with respect to the spool body, and not to rotate with respect to the spool shaft.

2. The spool according to claim 1, further comprising:
   a tubular support that does not rotate with respect to the spool shaft, wherein the spool body rotates with respect to the tubular support, the drag mechanism is between the spool body and the tubular support, and the radiator is mounted on the tubular support in a non-rotatable manner.

3. The spool according to claim 1, wherein the spool body includes a line winding drum around which a line is to be wound, a front flange and a rear flange arranged respectively on front and rear ends of the line winding drum, and a tubular portion on the rear flange, and the radiator is arranged inside the tubular portion.

4. The spool according to claim 1, wherein the radiator includes a contact member in contact with the drag mechanism, and an extension extending radially outwardly from the contact member, and the extension has a first heat discharging hole that discharges heat from the drag mechanism.

5. The spool according to claim 1, wherein the drag mechanism includes a first drag plate that does not rotate with respect to the spool shaft, and a second drag plate that is in contact with the first drag plate and that does not rotate with respect to the spool body, and the radiator is in contact with one of the first drag plate and the second drag plate.

6. The spool according to claim 1, further comprising
   a heat discharger inside the spool body and that rotates with respect to the radiator to guide internal heat of the spool body radially outwardly in the spool body.

7. The spool according to claim 6, wherein the heat discharger is mounted on the spool body in an integrally rotatable manner.

8. The spool according to claim 6, wherein the spool body includes a line winding drum around which a line is to be wound, a front flange and a rear flange arranged respectively on front and rear ends of the line winding drum, and a tubular portion on the rear flange, and the heat discharger is mounted on one of the front flange and the rear flange in an integrally rotatable manner, and the tubular portion has a heat discharging hole that discharges internal heat of the spool body out of the spool body.

9. The spool according to claim 6, wherein the heat discharger includes a plurality of blades to guide the internal heat of the spool body radially outwardly in the spool body.

10. A spinning reel, comprising:
    a spool shaft; and
    a spool including
    a spool body that rotates with respect to the spool shaft;
    a drag mechanism between the spool body and the spool shaft and to apply a braking force against a rotation of the spool body; and
    a radiator in the spool body and in contact with the drag mechanism, the radiator to rotate with respect to the spool body, and not to rotate with respect to the spool shaft, the spool mounted on the spool shaft.

11. The spinning reel according to claim 10, further comprising:
    a tubular support that does not rotate with respect to the spool shaft, wherein the spool body rotates with respect to the tubular support, the drag mechanism is arranged between the spool body and the tubular support, and the radiator is mounted on the tubular support in a non-rotatable manner.

12. The spinning reel according to claim 10, wherein the spool body includes a line winding drum around which a line is to be wound, a front flange and a rear flange arranged respectively on front and rear ends of the line winding drum, and a tubular portion on the rear flange, and the radiator is arranged inside the tubular portion.

13. The spinning reel according to claim 10, wherein the radiator includes a contact member in contact with the drag mechanism, and an extension extending radially outwardly from the contact member, and the extension has a first heat discharging hole for discharging heat from the drag mechanism.

14. The spinning reel according to claim 10, wherein the drag mechanism includes a first drag plate that does not rotate with respect to the spool shaft, and a second drag plate that is in contact with the first drag plate and does not rotate with respect to the spool body, and the radiator is in contact with one of the first drag plate or the second drag plate.

15. The spinning reel according to claim 10, further comprising
    a heat discharger inside the spool body and that rotates with respect to the radiator to guide internal heat of the spool body radially outwardly in the spool body.

16. The spinning reel according to claim 15, wherein the heat discharger is mounted on the spool body in an integrally rotatable manner.

17. The spinning reel according to claim 16, wherein the spool body includes a line winding drum around which a line is to be wound, a front flange and a rear flange arranged respectively on front and rear ends of the line winding drum, and a tubular portion on the rear flange, the heat discharger is mounted on one of the front flange and the rear flange in an integrally rotatable manner, and the tubular portion has a heat discharging hole for discharging internal heat of the spool body out of the spool body.

18. The spinning reel according to claim 16, wherein the heat discharger includes a plurality of blades to guide the internal heat of the spool body radially outwardly in the spool body.

19. A spool for a spinning reel mountable on a spool shaft, the spool comprising:
    a spool body that rotates with respect to the spool shaft;
    means for applying a braking force against a rotation of the spool body, the means for applying arranged between the spool body and the spool shaft; and
    means for dissipating heat in the spool body, for rotating with respect to the spool body, and for not rotating with respect to the spool shaft, the means for dissipating in contact with the means for applying.

* * * * *